US009210183B2

(12) United States Patent
Sadovsky et al.

(10) Patent No.: US 9,210,183 B2
(45) Date of Patent: Dec. 8, 2015

(54) DETECTING ANOMALOUS ACTIVITY FROM ACCOUNTS OF AN ONLINE SERVICE

(71) Applicant: MICROSOFT CORPORATION, Redmond, WA (US)

(72) Inventors: Art Sadovsky, Redmond, WA (US); Rustam Lalkaka, Redmond, WA (US); Vivek Sharma, Redmond, WA (US); Rajmohan Rajagopalan, Redmond, WA (US); Alexander Macleod, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/134,575

(22) Filed: Dec. 19, 2013

(65) Prior Publication Data

US 2015/0180894 A1  Jun. 25, 2015

(51) Int. Cl.
*G06F 11/00* (2006.01)
*G06F 12/14* (2006.01)
*G06F 12/16* (2006.01)
*G08B 23/00* (2006.01)
*H04L 29/06* (2006.01)
*G06F 3/0481* (2013.01)
(Continued)

(52) U.S. Cl.
CPC .......... *H04L 63/1425* (2013.01); *G06F 3/0481* (2013.01); *G06Q 20/4016* (2013.01); *H04L 63/1408* (2013.01); *H04L 67/22* (2013.01); *H04L 67/306* (2013.01)

(58) Field of Classification Search
CPC .... H04L 63/1425; H04L 67/22; G06F 3/0481
USPC .......................................................... 726/22
See application file for complete search history.

(56) References Cited

U.S. PATENT DOCUMENTS 5,819,226 A * 10/1998 Gopinathan et al. ............ 705/44
8,321,437 B2   11/2012 Lim
(Continued)

FOREIGN PATENT DOCUMENTS

WO       2004104780 A2   12/2004

OTHER PUBLICATIONS

YiHu; Identification of malicious transactions in database systems; Jul. 16-18, 2003; IEEE; ISBN: 0-7695-1981-4; pp. 329-335.*
(Continued)

*Primary Examiner* — Monjour Rahim
(74) *Attorney, Agent, or Firm* — Danielle Johnston-Holmes; Louise Bowman; Micky Minhas

(57) ABSTRACT

Anomalous activity is detected using event information that is received from accounts from within an online service. Generally, anomalous activity is detected by comparing a baseline profile that includes past event information for accounts of the online service with a recent profile that includes recent event information for the accounts. Anomalous activity is detected when the recent profile shows that one or more events are occurring more frequently as compared to the occurrence of the event the associated baseline profile. The events that are recorded and used in the anomaly detection may include all or a portion of events that are monitored by the online service. One or more reports may also be automatically generated and provided to one or more users to show activity that may be considered anomalous activity.

20 Claims, 12 Drawing Sheets

(51) Int. Cl.
*G06Q 20/40* (2012.01)
*H04L 29/08* (2006.01)

(56) References Cited

U.S. PATENT DOCUMENTS

| | | | |
|---|---|---|---|
| 2007/0289013 | A1 | 12/2007 | Lim |
| 2008/0172316 | A1* | 7/2008 | Adams ............................ 705/35 |
| 2008/0270303 | A1* | 10/2008 | Zhou et al. ...................... 705/44 |
| 2008/0270369 | A1 | 10/2008 | Myerson |
| 2008/0275820 | A1* | 11/2008 | Joao et al. ....................... 705/44 |
| 2009/0271343 | A1* | 10/2009 | Vaiciulis et al. ................ 706/21 |
| 2009/0313508 | A1 | 12/2009 | Yan |
| 2010/0228580 | A1* | 9/2010 | Zoldi et al. ........................ 705/7 |
| 2010/0274894 | A1 | 10/2010 | Devaki |
| 2012/0137367 | A1 | 5/2012 | Dupont et al. |
| 2012/0167084 | A1 | 6/2012 | Suit |
| 2012/0297477 | A1 | 11/2012 | Raviv |
| 2013/0031424 | A1 | 1/2013 | Srivastava et al. |
| 2013/0132561 | A1 | 5/2013 | Pasala et al. |

OTHER PUBLICATIONS

KC, et al., "ELT: Efficient Log-based Troubleshooting System for Cloud Computing Infrastructures", in 30th IEEE Symposium on Reliable Distributed Systems, Oct. 4, 2011, 10 pages.

Wang, et al., "Online Detection of Utility Cloud Anomalies Using Metric Distributions", in IEEE Network Operations and Management Symposium, Apr. 19, 2010, 8 pages.

Patcha, et al., "An Overview of Anomaly Detection Techniques: Existing Solutions and Latest Technological Trends", in Computer Networks, vol. 51, Issue 12, Aug. 2007, 25 pages.

Wang, et al., "VScope: Middleware for Troubleshooting Time-Sensitive Data Center Applications", in ACM/IFIP/USENIX 13th International Middleware Conference, Dec. 3, 2012, 20 pages.

Shen, et al., "CloudScale: Elastic Resource Scaling for Multi-Tenant Cloud Systems", in Proceedings of the 2nd ACM Symposium on Cloud Computing, Oct. 27, 2011, 14 pages.

UKEssays.com; "Monitoring and Load Balancing in Cloud Computing Computer Science Essay", Retrieved on: Aug. 27, 2013, Available at: http://www.ukessays.com/essays/computer-science/monitoring-and-load-balancing-in-cloud-computing-computer-science-essay.php.

Sarkar, et al., "Automated Incident Management for a Platform-as-a-Service Cloud", in Proceedings of the 11th USENIX Conference on Hot Topics in Management of Internet, Cloud, and Enterprise Networks and Services, Mar. 29, 2011, 6 pages.

Garg, et al., "SMICIoud: A Framework for Comparing and Ranking Cloud Services", in Fourth IEEE International Conference on Utility and Cloud Computing, Dec. 5, 2011, 9 pages.

Satterfield, Charlie, "Using System Center 2012 to Monitor the Infrastructure & Application Layers for Private, Public and Traditional Environments", Published on: Mar. 29, 2012, Available at: http://blogs.technet.com/b/server-cloud/archive/2012/03/29/using-system-center-2012-to-monitor-the-infrastructure-amp-application-layers-for-private-public-and-traditional-environments.aspx.

Moses, et al., "Shared Resource Monitoring and Throughput Optimization in Cloud-Computing Datacenters", in IEEE International Parallel & Distributed Processing Symposium, May 16, 2011, 9 pages.

"International Search Report and Written Opinion Issued in PCT Patent Application No. PCT/US2014/069638", Mailed Date: Mar. 10, 2015, 11 Pages.

U.S. Office Action dated Sep. 10, 2015 cited in U.S. Appl. No. 14/152,802, 35 pgs.

* cited by examiner

DETECTING ANOMALOUS ACTIVITY FROM ACCOUNTS OF AN ONLINE SERVICE

BACKGROUND

Anomaly detection is used for determining when patterns in data do not match an expected pattern. For example, credit card companies may use anomaly detection to help detect fraudulent activity relating to a customer's credit card. An online service may create a rule to detect anomalous activity when network traffic exceeds a predetermined threshold. Detecting anomalous activity that is associated with an online service can be challenging and time consuming. For example, there is typically an extremely large amount of data relating to the operation of the online service that may need to be analyzed. Instead of processing this large amount of data, many online services detect anomalous activity by determining when a predefined event occurs on a single machine or a few machines of the online service. For example, the predefined event may occur in response to network traffic for the online service exceeding some predetermined level or when a large number of processes are started in a short time period.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Anomalous activity is detected using event information that is monitored from accounts performing activities within an online service. Generally, anomalous activity is detected by determining when a baseline profile that represents "normal" activity for the online service is different from a recent profile that represents the "current" activity from accounts in the online service. For example, anomalous activity may be detected when an event, such as a create account event, is occurring more frequently in the recent profile as compared to the occurrence of the create account event in the baseline profile. The event information that is used in detecting anomalous activity may include all or a portion of events that are monitored by the online service. For example, the events used for anomaly detection may include all or a portion of security events (e.g., any event that changes permissions, such as creating accounts, changing permissions of one or more accounts, logging into the online service or logging out of the online service . . . ) as well as other types of events (e.g., system events, hardware events . . . ). An authorized user may configure the events to monitor and/or the events for one or more event categories may be automatically selected. The accounts that are monitored for anomalous activity may include all of or a portion of the accounts of the online service. For example, the accounts that are monitored for anomalous activity may be operator accounts (e.g., accounts that have permissions to create, modify, and delete accounts for other users or groups or users) or other types of accounts (e.g., user accounts, privileged accounts, and the like). In response to detecting anomalous activity, different activities may be performed. For example, an account may be blocked from performing operations, an account may be locked, one or more reports may be automatically generated and provided to one or more users to show activity that may be considered anomalous activity, and the like. Different types of reports may be generated. For example, one report may rank the accounts based on the level of anomalous activity detected whereas another report may provide more detailed information for one or more of the accounts.

DETAILED DESCRIPTION

Figure 1:
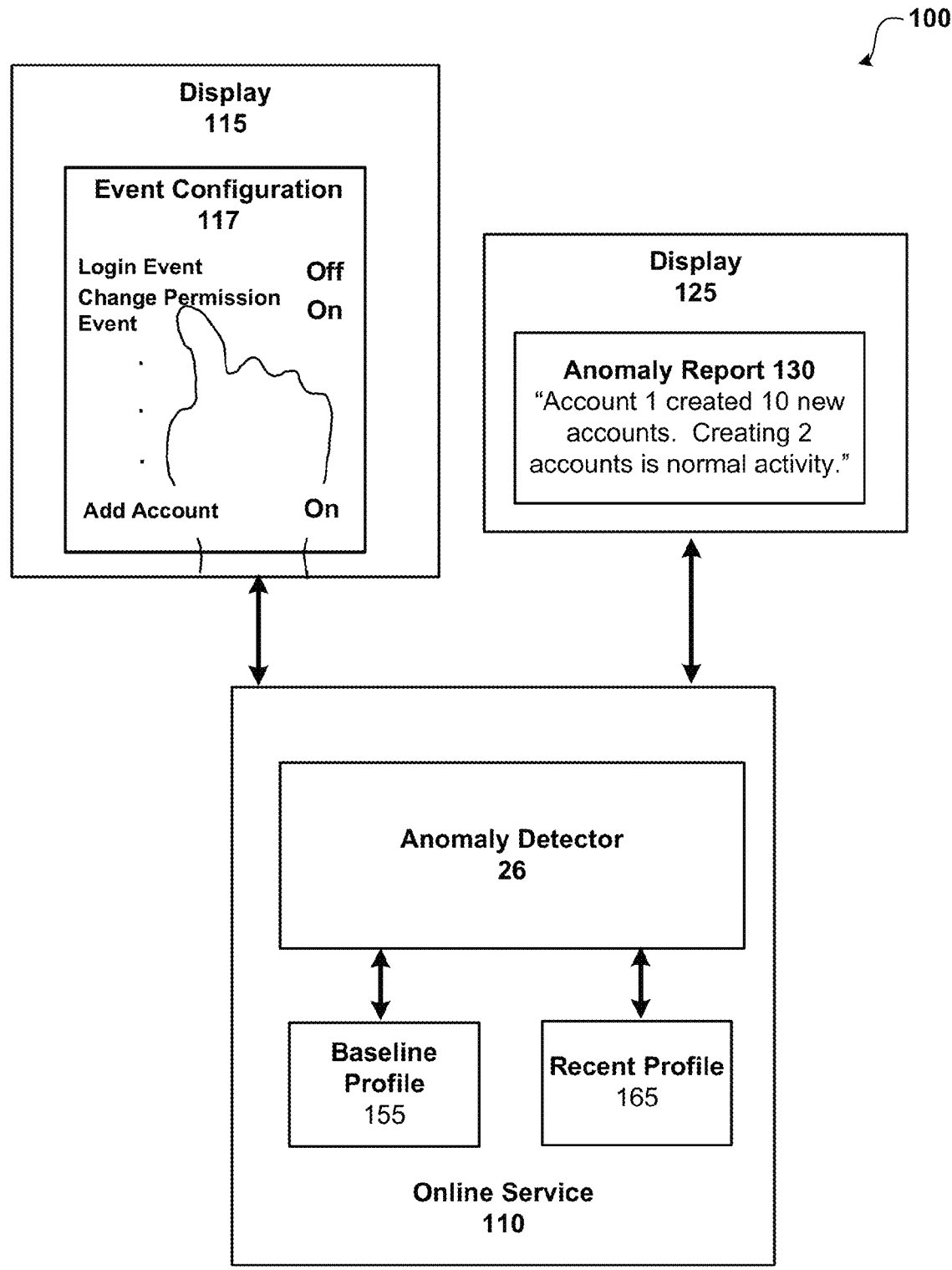
FIG. 1 shows an overview of a system for detecting anomalous activity from accounts of an online service.

Due to the sheer number of events that may be logged, online services typically examine a small subset of the events that are logged from a single machine (or a small number of machines) in the service in order to detect anomalous activity. For example, instead of examining the events from each machine in an online service, the online service selects one or two machines to monitor for anomalous activity. An online service may also establish hard coded rules to detect anomalous activity. For example, an online service may create a rule to identify a specific type of anomalous activity. According to embodiments of the invention, instead of creating individual rules to detect anomalous activity, an anomaly detector automatically detects anomalous activity based on events that are monitored and that are obtained from the different computing devices and accounts in the online service. Anomalous activity may be detected using any number of monitored events from accounts of the online system without creating individual rules. Instead of looking for a predetermined event or condition to occur in order to determine when a specific type of anomalous activity is occurring, anomalous activity is detected by comparing a frequency of events that represent the "normal" behavior for the online service with the frequency of the events that occur during a recent period of time in the online service. When the frequency of the events between the baseline profile and the recent profile are different, anomalous activity may be indicated. This anomalous activity is then provided to one or more users in the form of a report. According to an embodiment, a report is delivered that includes information related to the anomalous activity detected in the online service.

Referring now to the drawings, in which like numerals represent like elements, various embodiment will be described.

FIG. 1 shows an overview of a system for detecting anomalous activity from accounts of an online service. As illustrated, system 100 includes online service 110, anomaly detector 26, baseline profile 155, recent profile 165, display 115 and display 125.

Anomaly detector 26 is configured to detect anomalous activity that is occurring from accounts that are associated with online service 110. Anomalous activity is activity that deviates from the expected or normal behavior of the online service. For example, anomalous activity may be detected by anomaly detector 26 in response to an unusually large number of requests from accounts in the online service to: create new accounts; change permissions; start processes; and the like. In order to determine when the anomalous activity of online service 110 is occurring, anomaly detector 26 determines when a frequency of events that is stored in baseline profile 155 deviates from the frequency of the events in recent profile 165. For example, baseline profile 155 may indicate that during normal operation of online service 110, two accounts are created in a typical day. Today, however, recent profile 165 shows that ten different accounts were created by a particular account in the online service. In response to comparing baseline profile 155 to recent profile 165 and determining that the frequencies are different, anomaly detector 26 determines that anomalous activity may be occurring in online service 110 and generates anomaly report 130 that is shown displayed on display 125.

In the current example, anomaly report 130 shows a message that includes information showing the anomalous activity (e.g., "Account 1 created 10 new accounts) and also shows the normal activity (e.g., "Creating 2 accounts is normal activity). The report may be provided to one or more users to show activity that may be considered anomalous activity. Different reports may be generated. For example, one report may rank the accounts based on anomalous activity whereas another report provides more detailed information for one or more accounts Anomaly detector 26 may use all or a portion of monitored (e.g., logged) events of online service in order to detect anomalous activity. Instead of monitoring just one or two different events that occur on a single computing device in the online service and determining when a predetermined condition is met, anomaly detector 26 may use any number of the logged events from any number of accounts within the online service to detect anomalous activity. For example, anomaly detector may use each of the logged security events that occur within the online service (e.g., any event that changes permissions, such as creating accounts, changing permissions of one or more accounts, . . . ) in order to detect anomalous activity.

According to an embodiment, an authorized user may configure the events that are used by anomaly detector 26 to detect anomalous activity. In the current example, a Graphical User Interface (GUI) for event configuration 117 is displayed and is configured to receive event selection and configuration information from a user. For example, the user may select all or a portion of the events that are monitored by the online service for one or more accounts. In the current example, display 115 shows that the authorized user has selected to use change permission events and add account events but not to use login events when detecting anomalous activity. Other configuration information may also be received, such as, but not limited to weighting information; aggregation profiles and the like (See the FIGURES and related discussion below). When users do not specify a configuration, anomaly detector 26 uses a default algorithm weighting process. According to an embodiment, the default algorithm weighting process assigns events with a higher weight (that is, are more anomalous) the more rare the events are determined to occur based on the occurrence of the events in the baseline profile.

Online service 110 may be a cloud based and/or enterprise based service that may be configured to provide services, such as productivity services (e.g., messaging, collaboration, spreadsheets, documents, presentations, charts, and the like). More details regarding anomaly detection are provided below.

Figure 2:
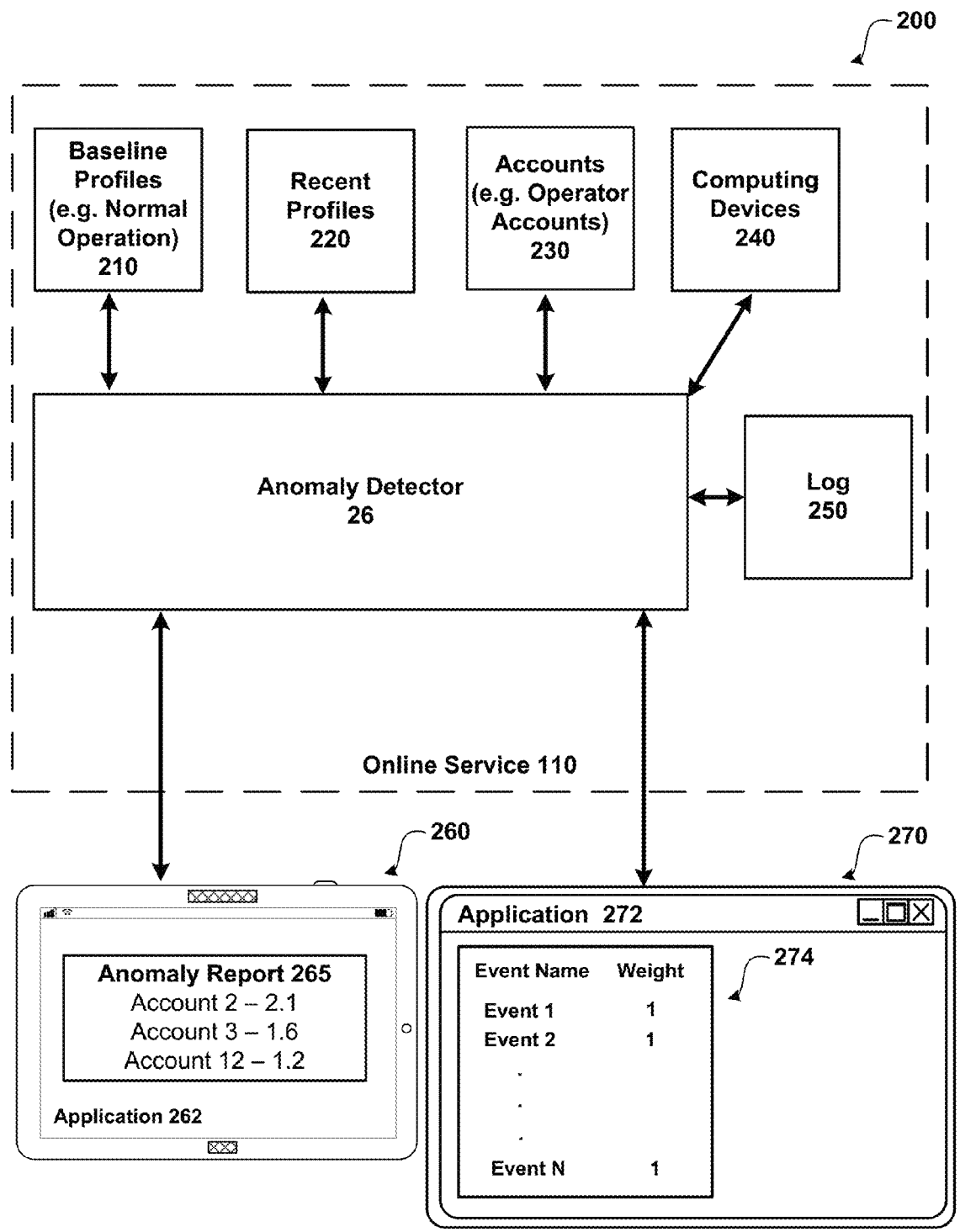
FIG. 2 shows a more detailed system for detecting anomalous activity from accounts of an online service.

FIG. 2 shows a more detailed system 200 for detecting anomalous activity from accounts of an online service.

As illustrated, system 200 includes application 262, application 272, tablet computing device 260, computing device 270 and online service 110 that includes anomaly detector 26, baseline profiles 210, recent profiles 220, accounts 230, computing devices 240 and log 250.

As discussed, anomaly detector 26 is configured to detect anomalous activity by using monitored event information from accounts 230 that are associated with online service 110. For example, the accounts that are monitored within the online service for anomalous activity may be operator accounts that have permissions to create, modify, and delete accounts for other users or groups or users. Other accounts, such as user accounts, may also be monitored for anomalous activity.

According to an embodiment, anomaly detector 26 detects anomalous activity by comparing frequencies of past events that are included in baseline profiles 210 with the frequencies of recent events that are included in recent profiles 220. A profile (e.g., a baseline profile or a recent profile) included event information for a single account of the online service or may include aggregated event information that is obtained from all or portion of the accounts of the online service. Anomalous activity may be detected by anomaly detector 26 when the recent event information for an account shows that one or more events are occurring more frequently as compared to the occurrence of the events as recorded in a baseline profile.

Anomaly detector 26 may use various methods in determining when anomalous activity is occurring within online service 210. According to an embodiment, anomaly detector 26 creates a frequency profile for each account or group of accounts that is associated with a profile. Anomaly detector 26 compares the frequency profile for the events that are associated with the baseline profile with the frequency profile for the events that are associated with the recent profiles. For example, when the frequency profile that is associated with the recent profile indicates that one or more events are occurring more frequently as compared to during "normal" operation as indicated by the baseline profile, anomalous activity is detected.

According to an embodiment, a frequency is determined for each event that is included in a profile. For example, for purposes of explanation and not intended to be limiting, assume four different events are being monitored. The baseline profile shows that event 1 accounts for 10% of the events, event 2 accounts for 25% of the overall events, event 3 accounts for 50% of the events, and event 4 accounts for 15% of the events. The recent profile shows that event 1 accounts for 20% of the events, event 2 accounts for 15% of the overall events, event 3 accounts for 50% of the events, and event 4 accounts for 15% of the events. In response to comparing the baseline profile with the recent profile, anomaly detector 26 detects that anomalous activity is occurring since the frequency of event 1 is larger in the recent profile as compared to the baseline profile. Other methods of detecting anomalous activity from accounts in the online service may be used. For example, other statistical methods may be used, such as: comparing a number of times each event occurs within a predetermined time period, aggregating the frequencies of some events and comparing the aggregated frequencies; or some other statistical method.

According to an embodiment, different events may be assigned different weights such that an increase in an occurrence of a more heavily weighted event within the monitored accounts indicates anomalous activity before an increase in an occurrence of an event that is not as heavily weighted. According to an embodiment, events that occur less frequently may automatically or manually be assigned a higher weight such that an increase in the occurrence of the event will more quickly indicate anomalous activity. For example, login events may be set to a lower weight as compared to creating account events since login events are generally common events in an online service. The weights may be assigned automatically and/or manually.

Upon detection of anomalous activity by anomaly detector 26, different actions may be performed. For example, one or more reports may be automatically created and delivered (e.g., anomaly report 265), one or more accounts may be locked such that future activity is stopped, certain actions may be prevented from occurring within the online service, and the like. A report may be generated and provided to one or more users to show activity that may be considered anomalous activity. Different reports may be generated. For example, anomaly report 265 ranks the accounts based on detected anomalous activity whereas another report provides more detailed information for one or more accounts (See FIG. 4 and related discussion).

Baseline profiles 210 include one or more baseline profiles that include event information that relates to the "normal" or "typical" operation of online service 110. Each baseline profile 210 includes event information for a predetermined period of time of the online service (e.g., one week, two weeks, one month, two months . . . ) within each of the baseline profiles 210. The baseline profiles 210 may be updated according to a predetermined schedule (e.g., daily, weekly . . . ) or using some other method (e.g., upon request). According to an embodiment, an authorized user may configure the event information that is included in the baseline profile, the period of time for the event information that is included in the baseline profile, as well as an update schedule. For example, the authorized user may configure the baseline profile to store the last month of event information for one or more different types of accounts of the online service and be updated daily.

Recent profiles 220 include one or more recent profiles that include event information that relates to events that occur in a recent period of time of online service 110. For example, a recent profile may include event information for one or more accounts that was generated by activity that occurred within the last day of the service, a last number of hours within the online service, and the like. Generally, the event information that is included in a recent profile is more recent event information as compared to the event information that is included in the baseline profile(s) 210. The recent event information may be used to update the baseline profiles. For example, the baseline profiles may be updated with recent event information each day or some other period of time. In this way, the baseline profiles may include event information from a rolling window of time (e.g., the last month, two months, three months . . . ) of events that are generated by accounts in the online service 110.

Log 250 is configured to store event information that is generated by one or more accounts of online service 110. According to an embodiment, log 250 stores records of events, including security events that are generated by accounts in the online service. For example, log 250 includes records of login/logout activity and other security-related events that are generated by one or more accounts 230 that occurred on one or more computing devices 240 that are associated with online service 110. According to an embodiment, the log data that is stored in log 250 includes information that is specified by a system's audit policy. Generally, an authorized user may configure the system to record different events and type of events in log 250.

Many types of events may be logged and used by anomaly detector when detecting anomalous activity in the online service. Some example categories of events that may be logged include: account logon events, account management events, directory service access events, object access events, policy changes, privileged operations, system events, and the like. For example, each time an object is created, accessed, changed or deleted; an event may be generated and logged. A list of more detailed events that may be logged and used in the detection of anomalous activity may be found in the discussion of FIG. 8.

Figure 3:
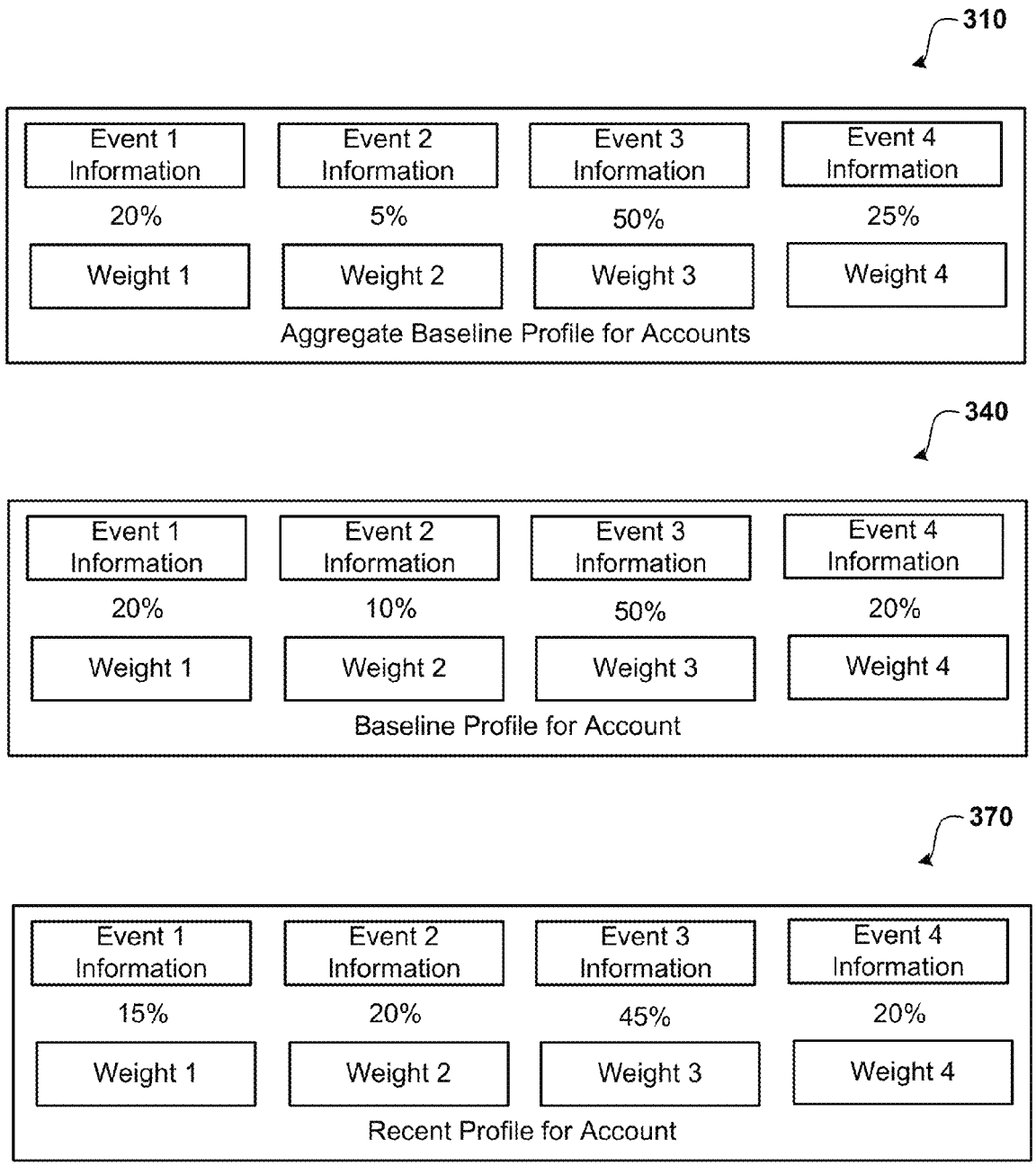
FIG. 3 shows different profiles including event information and weighting of events used in detecting anomalous activity from accounts within an online service.

FIG. 3 shows different profiles including event information and weighting of events used in detecting anomalous activity from accounts within an online service.

As discussed herein, each profile includes event information for all or a portion of the events that are monitored and/or logged that originate from accounts of the online service. The following profiles are illustrated for exemplary purposes and are not intended to be limiting. While each profile illustrated shows four different events, more or less events may be included in a profile. For example, a profile may include hundreds or thousands of different types of events.

Profile 310 shows an aggregate baseline profile for a number of accounts of the online service. For example, profile 310 may include event information that is generated from many different types of accounts that are within an online service or may include all or a portion of a specific type of account. According to an embodiment, an aggregate profile is created that includes each operator account of the online service. As discussed, the term operator account refers to accounts that have permissions to create, modify, and delete accounts for other users or groups or users. Other type of accounts within online service may also be included (e.g. user accounts).

In the current example, profile 310 includes event information for four different events (Event 1, Event 2, Event 3 and Event 4). While four events are shown there may be fewer events or more events that are included to detect anomalous activity. For example, the events may include all or a portion of security events (See discussion in FIG. 8 for a more detailed list of security events) as well as any other event that may be monitored by the online service (e.g., machine actions, user actions, and the like). Each event that is included in a profile includes different event information. The event information may include information, such as: a type of the event; a time the event occurred; what account generated the event; a result of the event; and the like. For example, an event may be a process start event that was started by account 2 at 11:06 AM that resulted in a specific process being started. According to another embodiment, the profile may include a number of times each event that is monitored occurs within a specified period of time (e.g. within a day, a week, . . . ).

The percentages that are shown below the event information in profile 310, as well as profiles 340 and 370, show what percentage of time each of the events occur. In the current example for aggregate profile 310, event 1 occurs 20% of the time, event 2 occurs 5% of the time, event 3 occurs 50% of the time and event 4 occurs 25% of the time. Generally, events that occur more frequently are typically common events such as logging into the service, logging off of the service, and the like.

As discussed, each event may be weighted the same or differently from other events that are being monitored and used in detecting any anomalous activity. For example, each event may be weighted to a same value, such as 1, or may be weighted using some other criteria. According to an embodiment, the weighting is based on the frequency of the event that is within a profile. For example, a weight for less frequently occurring events would be weighted more heavily as compared to more frequently occurring events. Events that typically occur less often, such as creating an account, may be considered more indicative of anomalous activity as compared to common events, such as login or logoff events. According to an embodiment, the relative weight for each event is automatically determined by dividing the percentage of the highest occurring event by the percentage of the occurrence of each event in the profile. In the current example shown in profile 310, the automatically determined weighting would result in weight 1 being 2.5 times higher as compared to the weight for event 3, weight 2 would be 10 times higher as compared to the weight for event 3, and weight 4 would be weighted 2 times higher as compared to the weight for event 3. Other weighting methods may be used. For example, each weight may be based on a type of event and/or each weight may be manually configured by an authorized user (See FIG. 4 for an example Graphical User Interface for configuring weights). The weights may be configured manually or automatically.

Baseline profile 340 is an exemplary baseline profile for a single account of the online service. According to an embodiment, each account includes a baseline profile that may be used to determine the "normal" behavior for an account. In the current example, baseline profile 340 includes the same event information as aggregate baseline profile 310. The frequency of the occurrence of the events, however, for baseline profile 340 may be different as compared to the aggregate baseline profile 310. As illustrated, the percentage of occurrence for event 1 and event 3 are the same, but the percentages for event 2 and event 4 are different. The percentage of occurrence for event 2 is greater in the baseline profile 340 as compared to the occurrence for event 2 in the baseline profile 310 (10% compared 5%). The percentage of occurrence for event 4 is less in the baseline profile 340 as compared to the occurrence for event 4 in the baseline profile 310 (20% compared 25%). As discussed herein, anomalous activity may be detected using baseline profiles relating to a single account and/or detected using one or more aggregate baseline profiles. In some cases, a newly created account would not have an established baseline profile. In this case, the recent profile for the newly created account may be compared against an aggregate profile or a different account in order to detect anomalous activity.

Recent profile 370 is an exemplary recent profile for a single account of the online service. A recent profile may be created for a single account and/or an aggregation of accounts. In the current example, recent profile 370 includes the same event information as aggregate baseline profile 310. The occurrence of the events for recent profile 370 is different as compared to both the aggregate baseline profile 310 as well as for baseline profile 370. Comparing recent profile 370 to either of the baseline profiles (310, 340) indicates anomalous activity is occurring for the account. For example, the percentage of occurrence of event 2 in the recent profile is 2 times greater than baseline profile 340 indicates and 4 times greater than the aggregate baseline profile 310 indicates.

Figure 4:
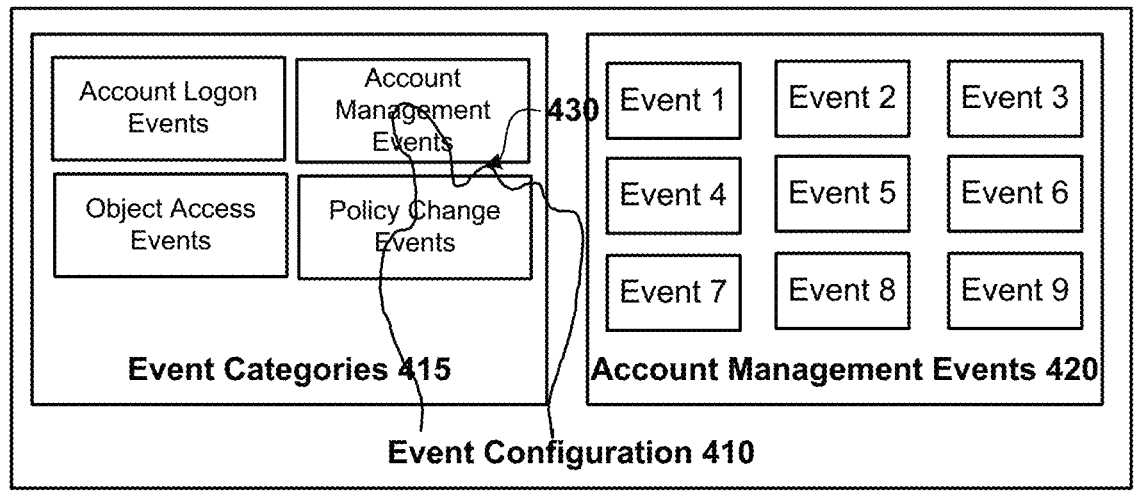
FIG. 4 shows example Graphical User Interfaces for viewing and configuring events relating to anomaly detection.
Figure 4:
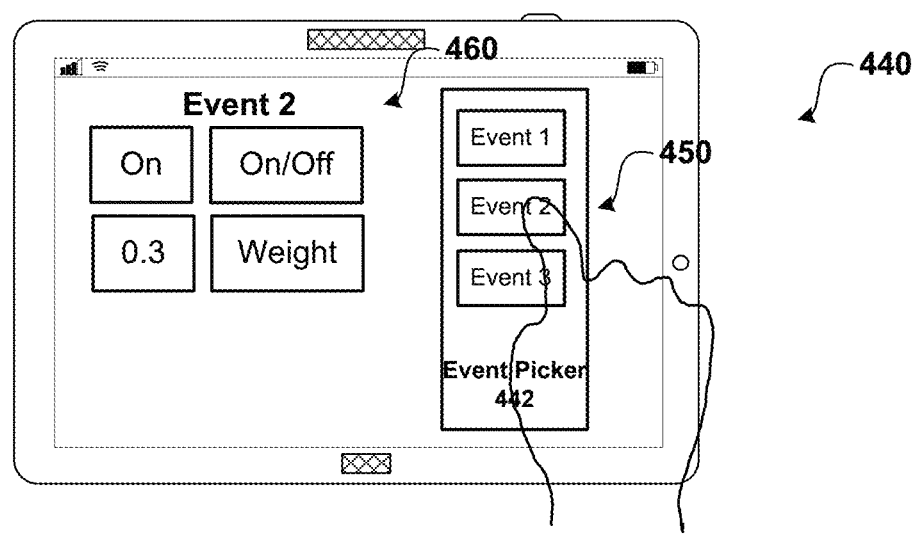

FIG. 4 shows example Graphical User Interfaces (GUIs) for viewing and configuring events relating to anomaly detection. The GUIs shown in FIG. 4 are for illustrative purposes and are not intended to be limiting.

The first GUI that is shown is an event configuration 410 display that shows an exemplary GUI for selecting and configuring events to be monitored for anomaly detection for an online service. Event categories 415 section shows different categories of events that may be selected for monitoring. While four event categories are shown, many other event categories may be displayed. According to an embodiment, each event and category of event that is monitored by the online service may be selected for use in anomaly detection. In the current example, the event categories that are shown in event configuration 410 includes account logon events, account management events, object access events and policy change events. As illustrated a user 430 is selecting the account management events category.

In response to receiving a selection of an event category, such as the account management events, a more detailed view of each of the events that are included in the event category are displayed. In the current example, account management events 420 shows the different events that are contained within the selected account management events category. According to an embodiment, a user may select or deselect the individual events of the selected event category to include in anomaly detection. For example, a user may select the account management event category and then deselect a couple of the events from being used in the anomaly detection.

Display 440 shows an exemplary display including an event picker 442 that displays a list of different events that may be configured and used in anomaly detection. In the current example, user 450 has selected event 2. In response to selecting Event 2, a more detailed view 460 of configuration is displayed. In the current example, Event 2 is shown to be set to "On" indicating that Event 2 is being monitored for anomaly detection. A user may also turn off Event 2 by selecting the On/Off user interface element. A weight of "0.3" has also been set for Event 2. According to an embodiment, an authorized user may configure the weighting of different events such that different events are given more weight in detecting anomalous activity. A default weight for an event may be set. According to an embodiment, the default weight for each event is set to vary inversely with the frequency of that event in the baseline profile. For example, if Event 1 occurs with frequency 10% in the baseline profile, it may have a weight of 1/0.1=10. If Event 1 occurs with frequency 50% in the baseline profile, it may have a weight of 1/0.5=2. The specific calculation may also be configurable. For example, the weight may be the square of the inverse frequency, or some other calculation related to the inverse.

Figure 5:
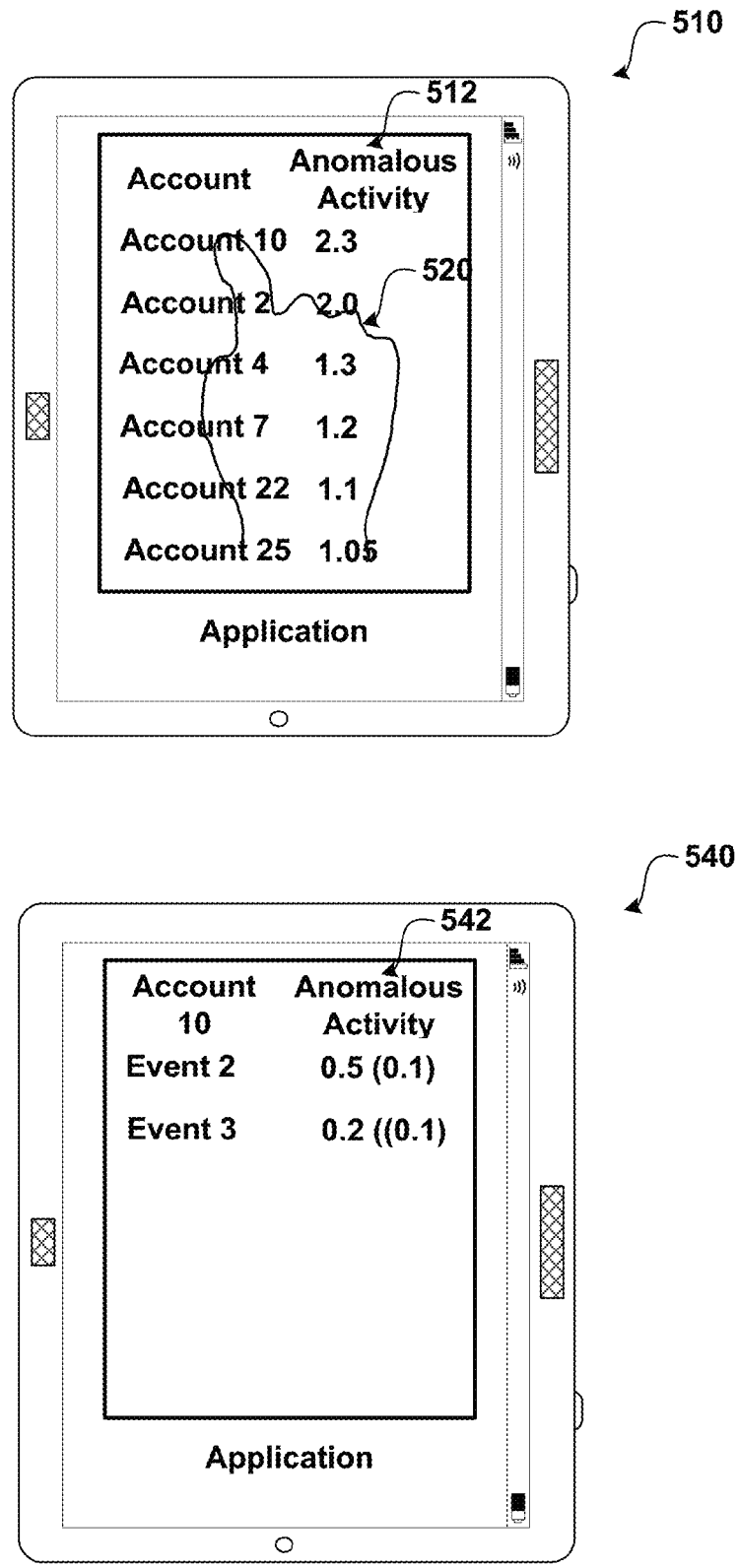
FIG. 5 shows exemplary reports showing detected anomalous activity for one or more accounts within the online service.

FIG. 5 shows exemplary reports showing detected anomalous activity for one or more accounts within the online service.

Display 510 shows an example report that indicates possible anomalous activity of different accounts. Anomaly report 512 is illustrated for exemplary purposes and is not intended to be limiting. Many other types of reports showing anomalous activity may be created and displayed. As illustrated, report 512 lists a portion of the accounts being monitored for anomalous activity in the order from highest detected anomalous activity to lowest detected anomalous activity. Anomaly report 512 shows the accounts that have detected anomalous activity. For example, accounts that are operating normally and in which anomalous activity is not detected, are not shown in anomaly report. According to an embodiment, any account that has a value above some predefined number (threshold) has potential anomalous activity. According to an embodiment, a value above the predefined number (threshold) indicates that at least one event that is being monitored is currently occurring more frequently as compared to the frequency of occurrence that is included in the baseline profile. In the current example, a user may select one of the displayed accounts to obtain more information relating to the detected anomalous activity. As shown, user 520 selects Account 10 from anomaly report 512 to obtain a more detailed view of the account as shown in display 540.

Display 540 illustrates an example of more detailed information that may be displayed for an account in which anomalous activity is detected. As illustrated, the more detailed information shows the events that indicate anomalous activity as well as the baseline profile for the events. In display 540, two different events being monitored are showing anomalous activity. In the current example, Event 2 is occurring five times more than what is considered normal (0.5 as compared to 0.1). Event 3 is occurring twice as often as normal event occurrence (0.2 compared to 0.1).

Figure 6:
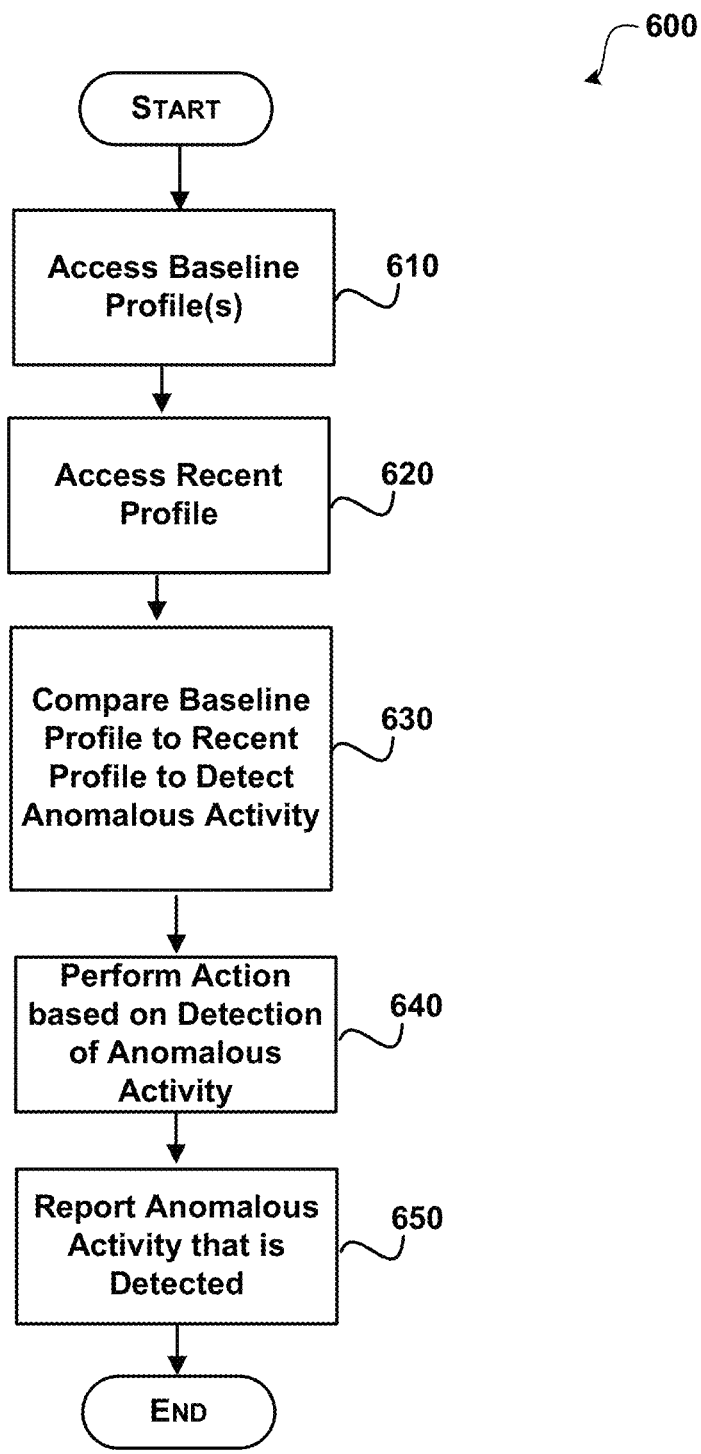
FIG. 6 illustrates a process for detecting anomalous activity in an online service by comparing a baseline profile to a recent profile.
Figure 7:
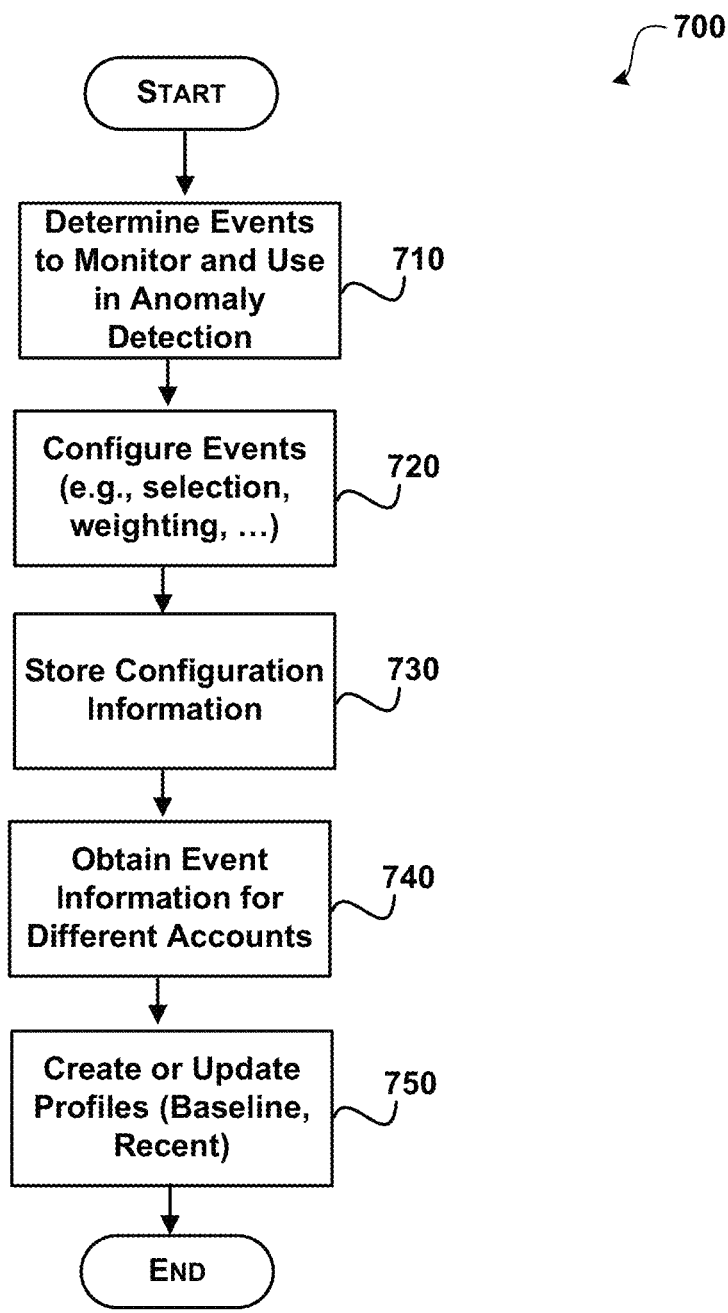
FIG. 7 illustrates a process for configuring and storing event information within a baseline profile and a recent profile.

FIGS. 6 and 7 illustrate processes for anomaly detection using account information from an online service. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

FIG. 6 illustrates a process 600 for detecting anomalous activity in an online service by comparing a baseline profile to a recent profile.

After a start operation, the process moves to operation 610, where one or more baseline profiles are accessed. The baseline profile may be a baseline profile for a single account or may be an aggregated baseline profile that includes event information from more than one account of the online service. For example, each tenant within an online service may have a separate baseline profile for each account that is monitored for anomalous activity. As discussed, the baseline profile includes event information that is generated from one or more accounts and indicates the "normal" operation of an account or accounts. According to an embodiment, the profiles include event information that relates to security events that are associated with one or more accounts of the online service. The event information may be configured by an authorized user and/or automatically selected based on the monitored events of the online system. For example, the online service may automatically select all or a portion of the monitored or logged events in the online service.

Flowing to operation 620, a recent profile is accessed. The recent profile includes event information that is obtained from a recent period of time. A recent period of time may include a time period, such as, but not limited to the last hour, two hours, three hours, four hours, eight hours, day, and the like. According to an embodiment, the recent profile includes event information from one or more accounts for the last six hours. The recent profile may include a single account of the online service and/or an aggregate of accounts of the online service.

Transitioning to operation 630, the baseline profile is compared to the recent profile to detect anomalous activity of the online service. The comparison of the recent profile with the baseline profile may be performed using different methods. According to an embodiment, the comparison includes determining when the frequency of one or more of the events being monitored is different between the baseline profile and the recent profile. According to an embodiment, a weighting factor is used to adjust the importance of an occurrence of an event. For example, an increase in the number of accounts being created (a more heavily weighed event) for an account may be considered more of an indication of anomalous activity as compared to an increase in the number of windows being opened (a less heavily weighted event) by an account.

Moving to operation 640, an action may be performed based on the detected anomalous activity. One or more actions may occur. The actions that are performed relate to notifying one or more users of the detected anomalous activity and/or attempting to stop or limit the detected anomalous activity. For example, one or more reports may be created and delivered (operation 650), one or more accounts may be locked such that future anomalous activity from the one or more accounts is stopped, certain actions may be prevented from occurring from one or more accounts, and the like.

Flowing to operation 650, anomalous activity that is detected is reported. There are many different methods that may be used to report anomalous activity. For example, a summary report may be created and delivered that ranks each account according to its detected anomalous activity. According to an embodiment, the accounts are ranked according to a level of detected anomalous activity for the account. A more detailed report for each account may also be created for delivery and/or viewing. According to an embodiment, the more detailed report may be accessed by selecting the account from within the summary report of the anomalous activity.

The process then flows to an end operation and returns to processing other actions.

FIG. 7 illustrates a process 700 for configuring and storing event information within a baseline profile and a recent profile.

After a start operation, the process moves to operation 710, where the events to monitor and use in anomaly detection are determined. The determination may be automatically and/or manually performed. For example, instead of manually selecting each event to monitor, each event that is currently being monitored and logged may be used in detecting anomalous activity. As another example, an authorized user may select the events to be monitored. This selection may be in place of or in addition to the events that are currently being used in the anomaly detection. According to an embodiment, a GUI is displayed that allows the authorized user to select the events to monitor and use in the anomaly detection.

Flowing to operation 720, the events that are determined to be used in the anomaly detection for the online service are configured. The configuration may include manual configuration as well as automatic configuration. For example, an authorized user may set weightings to associate with the different events. According to an embodiment, the weightings for the events that are being monitored are automatically set to different values based on the percentage of times the event occurs. In this example, events that occur more frequently are considered to be less important in detecting anomalous activity as compared to events that typically occur less frequently in the online service. For example, an event that creates an account may be weighted more heavily as compared to a login event.

Transitioning to operation 730, the configuration information is stored. The configuration information may be stored in one more locations. For example, the configuration information may be stored in a data store of the online service and/or in an external data store from the online service.

Flowing to operation 740, the event information from different accounts in the online service is obtained. According to an embodiment, the event information is obtained from a log that records event information that is associated with the different accounts of the online service. The event information may be obtained automatically or manually. For example, the event information may be obtained every one hour, two hours, six hours, daily, and the like. Different accounts and types of accounts may be monitored for the different events. According to an embodiment, operator accounts of the online service are monitored and data from the monitoring is logged by the online service. Other types of accounts may also be monitored. For example, an authorized user may configure to monitor events for each account of the online service or select a subset of account to monitor. The event information may include different types of information. For example, the event information may include information such as but not limited to: a type of event, a time the event occurred, a result of the event, and the like.

Transitioning to operation 750, profiles are updated with the event information. One or more profiles, such as baseline profiles and recent profiles, may be updated with the event information. According to an embodiment, a baseline profile and a recent profile for each account that is being monitored is updated. An aggregate baseline profile and an aggregate recent profile are also updated. The aggregate profiles include event information that is generated from more than one account. According to an embodiment, the aggregate profiles include account information for each account of a tenant of the online service. For example, separate aggregate profiles are maintained for each of the different customers that are serviced by the online service. As discussed, the different profiles may be used to detect anomalous activity of the online service.

The process then flows to an end operation and returns to processing other actions.

Figure 8:
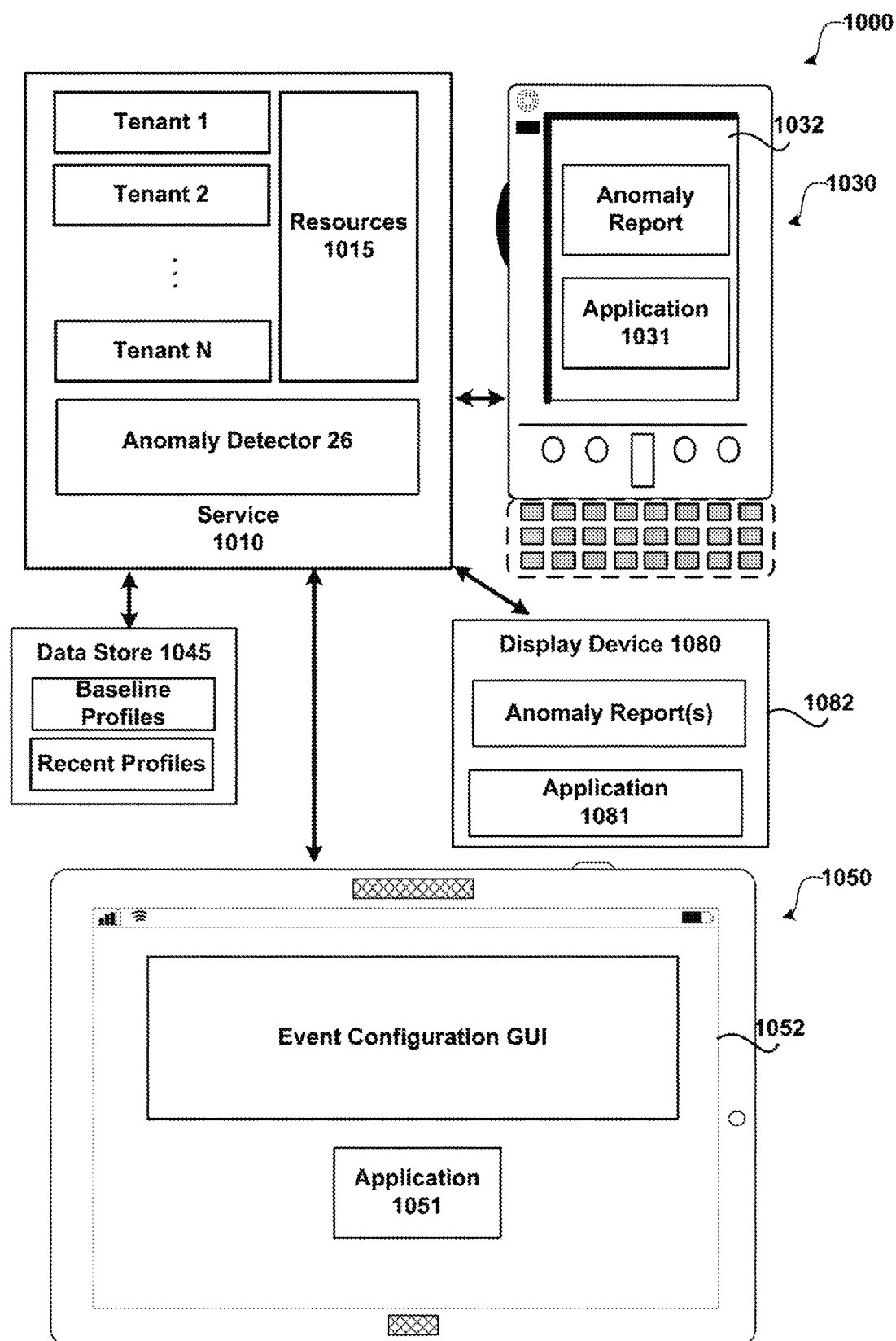
FIG. 8 illustrates an exemplary online system for detecting anomalous activity.

FIG. 8 illustrates an exemplary online system that includes anomaly detection. As illustrated, system 1000 includes service 1010, data store 1045, and touch screen input device 1050 (e.g. a slate), smart phone 1030 and display device 1080.

As illustrated, service 1010 is a cloud based and/or enterprise based service that may be configured to provide services, such as productivity services (e.g. spreadsheets, documents, presentations, charts, messages, and the like). The service may be interacted with using different types of input/output. For example, a user may use speech input, touch input, hardware based input, and the like. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, and inductive sensors.

According to an embodiment, smart phone 1030, touch screen input device 1050, and device 1080 each include an application (1031, 1051, 1081).

As illustrated, touch screen input device 1050, smart phone 1030, and display device 1080 shows exemplary displays 1052/1032/1082 showing the use of an application and a display relating to anomaly detection. Data may be stored on a device (e.g. smart phone 1030, slate 1050 and/or at some other location (e.g. network data store 1045). Data store 1045, or some other store, may be used to store data sets, event information, baseline profiles, recent profiles, as well as other data. The applications used by the devices may be client based applications, server based applications, and cloud based applications and/or some combination. According to an embodiment, display device 1080 is a device such as a MICROSOFT XBOX coupled to a display.

Anomaly detector 26 is configured to perform operations relating to detecting anomalous activity as described herein. While anomaly detector 26 is shown within service 1010, the functionality of the anomaly detector may be included in other locations (e.g. on smart phone 1030 and/or slate device 1050 and/or device 1080).

Some example events that may be monitored and included in the baseline profile and the recent profile include, but are not limited to: the operating system is starting up; the operating system is shutting down; An authentication package has been loaded by the Local Security Authority; A trusted logon process has been registered with the Local Security Authority; Internal resources allocated for the queuing of audit messages have been exhausted, leading to the loss of some audits; A notification package has been loaded by the Security Account Manager; Invalid use of a port; the system time was changed; A monitored security event pattern has occurred; Administrator recovered system from CrashOnAuditFail; A security package has been loaded by the Local Security Authority; An account was successfully logged on; An account failed to log on; User/Device claims information; An account was logged off; User initiated logoff; A logon was attempted using explicit credentials; A replay attack was detected; A handle to an object was requested; A registry value was modified; The handle to an object was closed; A handle to an object was requested with intent to delete; An object was deleted; A handle to an object was requested; An operation was performed on an object; An attempt was made to access an object; An attempt was made to create a hard link;

An attempt was made to create an application client context; An application attempted an operation; An application client context was deleted; An application was initialized; Permissions on an object were changed; An application attempted to access a blocked ordinal; Special privileges assigned to new logon; A privileged service was called; An operation was attempted on a privileged object; Security Identifiers (SIDs) were filtered; A new process has been created; A process has exited; An attempt was made to duplicate a handle to an object; Indirect access to an object was requested; Backup of data protection master key was attempted; Recovery of data protection master key was attempted; Protection of auditable protected data was attempted; Unprotection of auditable protected data was attempted; A primary token was assigned to process; A service was installed in the system; A scheduled task was created, deleted, enabled, disabled or updated; A user right was assigned or removed; A user right was removed; A new trust was created to a domain; A trust to a domain was removed; Kerberos policy was changed; Encrypted data recovery policy was changed; The audit policy on an object was changed; Trusted domain information was modified; System security access was granted or removed to or from an account; System audit policy was changed; A user account was created, changed or enabled; An attempt was made to change or reset an account's password; An attempt was made to reset an accounts password; A user account was disabled or deleted; A user account was deleted; A security-enabled global group was created, changed or deleted; A member was added to a security-enabled global group or removed from a security-enabled global group; A security-enabled local global group was deleted, changed or created; A member was added to a security-enabled local group or removed from a security-enabled local group; Domain Policy was changed; A user account was locked out; A computer account was created, changed or deleted; A security-disabled local group was created or changed; A member was added to a security-disabled local group or removed from a security-disabled local group; A security-disabled local group was deleted, created or changed; A member was added to a security-disabled global group or removed from a security-disabled global group; A security-disabled global group was deleted; A security-enabled universal group was created or changed; A member was added or removed to a security-enabled universal group; A security-enabled universal group was created, changed or deleted; A member was added or removed to a security-disabled universal group; A security-disabled universal group was deleted; A groups type was changed; SID History was added to an account; An attempt to add SID History to an account failed; A user account was unlocked; A Kerberos authentication ticket was requested; A Kerberos service ticket was requested or renewed; Kerberos pre-authentication failed; A Kerberos authentication ticket request failed; A Kerberos service ticket request failed; An account was mapped for logon; An account could not be mapped for logon; The domain controller attempted to validate the credentials for an account; The domain controller failed to validate the credentials for an account; A session was reconnected or disconnected; The Access Control List was set on accounts which are members of administrators groups; The name of an account was changed; The password hash an account was accessed; A basic application group was created, changed or deleted; A member was added to a basic application group or removed from a basic application group; A non-member was added to a basic application group or removed from a basic application group; A Lightweight Directory Access Protocol (LDAP) query group was created or deleted; The Password Policy Checking API was called; An attempt was made to set the Directory Services Restore Mode administrator password; An attempt was made to query the existence of a blank password for an account; RPC detected an integrity violation while decrypting an incoming message; Auditing settings on object were changed; Proposed Central Access Policy does not grant the same access permissions as the current Central Access Policy; Central Access Policies on the machine have been changed; A namespace collision was detected; A trusted forest information entry was added, removed or was modified; The certificate manager denied a pending certificate request; Certificate Services received a resubmitted certificate request; Certificate Services revoked a certificate; Certificate Services received a request to publish the certificate revocation list (CRL); Certificate Services published the certificate revocation list (CRL); A certificate request extension changed; One or more certificate request attributes changed; Certificate Services received a request to shut down; Certificate Services backup started or completed; Certificate Services restore started or completed Certificate Services started or stopped; The security permissions for Certificate Services changed; Certificate Services retrieved an archived key; Certificate Services imported a certificate into its database; The audit filter for Certificate Services changed; Certificate Services received a certificate request; Certificate Services approved a certificate request and issued a certificate; Certificate Services denied a certificate request; Certificate Services set the status of a certificate request to pending; The certificate manager settings for Certificate Services changed; A configuration entry changed in Certificate Services; A property of Certificate Services changed; Certificate Services archived a key; Certificate Services imported and archived a key; Certificate Services published the CA certificate to Active Directory Domain Services; One or more rows have been deleted from the certificate database; Role separation enabled; Certificate Services loaded a template; A Certificate Services template was updated; Certificate Services template security was updated; The Per-user audit policy table was created; An attempt was made to register a security event source; An attempt was made to unregister a security event source; A CrashOnAuditFail value has changed; Auditing settings on object were changed; Special Groups Logon table modified; The local policy settings for Trusted Platform Base services (TBS) were changed; The group policy settings for the TBS were changed; Resource attributes of the object were changed; Per User Audit Policy was changed; Central Access Policy on the object was changed; An Active Directory replica source naming context was established, removed, or modified; An Active Directory replica destination naming context was modified; Synchronization of a replica of an Active Directory naming context has begun or ended; Attributes of an Active Directory object were replicated; Replication failure begins or ends; A lingering object was removed from a replica; The following policy was active when a Firewall started; A rule was listed when the Firewall started; A change has been made to Firewall exception list, such as a rule was added, modified or deleted; Firewall settings were restored to the default values; A Firewall setting has changed; A rule has been ignored because its major version number was not recognized by Firewall; Parts of a rule have been ignored because its minor version number was not recognized by Firewall; A rule has been ignored by Firewall because it could not parse the rule; Firewall Group Policy settings has changed; Firewall has changed the active profile; Firewall did not apply the following rule; Firewall did not apply the following rule because the rule referred to items not configured on this computer; Special groups have been assigned to a new logon; Internet Protocol Security (IPSec)

Services was started; IPsec Services was disabled; IPsec Services encountered a potentially serious failure; An IPsec Main Mode security association was established; An IPsec Main Mode security association was established; An IPsec Main Mode negotiation failed; An IPsec Main Mode negotiation failed; An IPsec Quick Mode negotiation failed; An IPsec Main Mode security association ended; IPsec dropped an inbound packet that failed an integrity check; IPsec dropped an inbound packet that failed a replay check; IPsec dropped an inbound packet that failed a replay check; IPsec dropped an inbound clear text packet that should have been secured; IPsec received a packet from a remote computer with an incorrect Security Parameter Index (SPI); During Main Mode negotiation, IPsec received an invalid negotiation packet; During Quick Mode negotiation, IPsec received an invalid negotiation packet; During Extended Mode negotiation, IPsec received an invalid negotiation packet; IPsec Main Mode and Extended Mode security associations were established; An IPsec Extended Mode negotiation failed and the state of a transaction has changed.

Custom events may also be monitored. According to an embodiment, a a log file records the custom events whenever the online service detects the custom event by any user of that online service.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
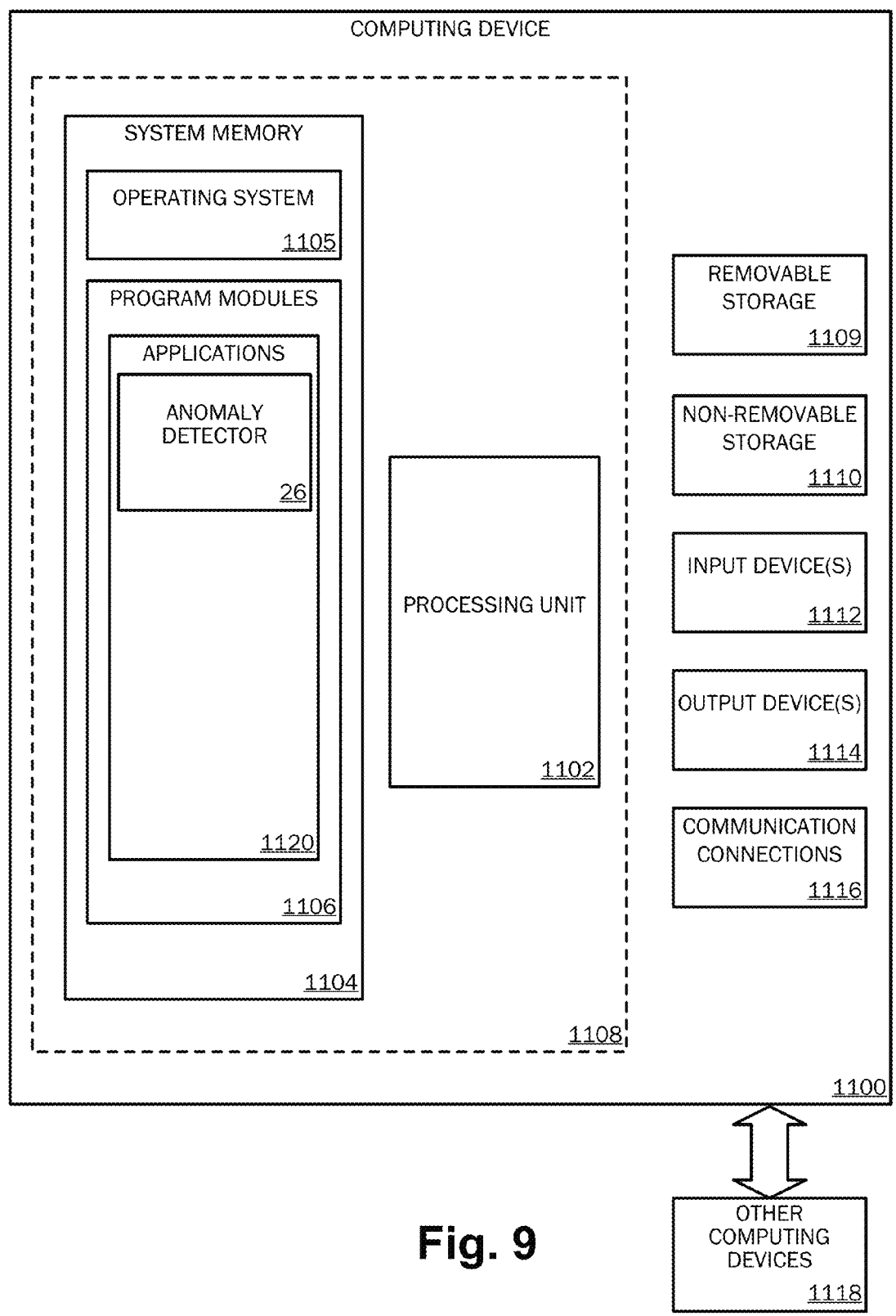
FIGS. 9, 10A, 10B and 11 and the associated descriptions provide a discussion of a variety of operating environments in which embodiments of the invention may be practiced.
Figure 10A:
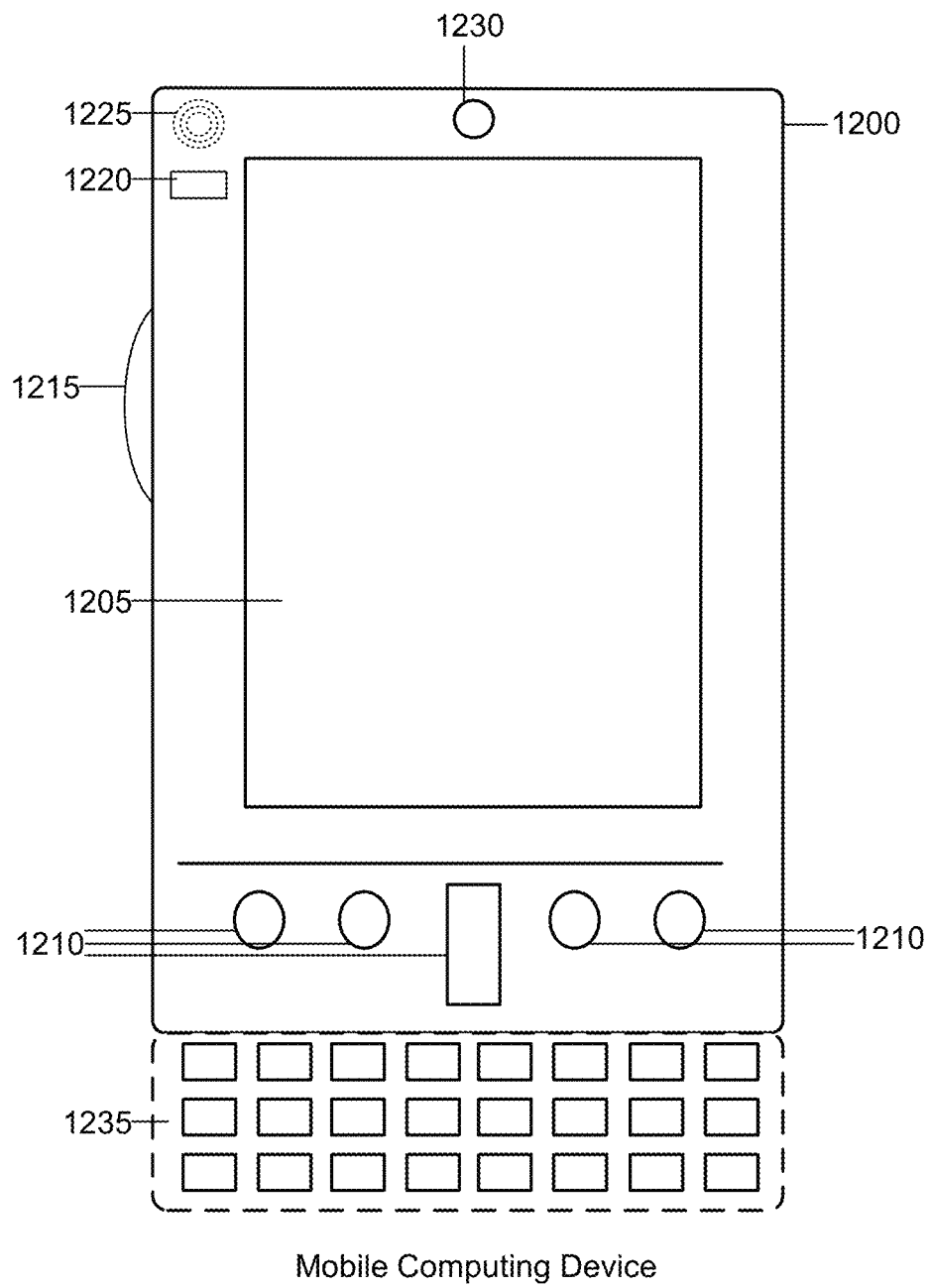
Figure 10B:
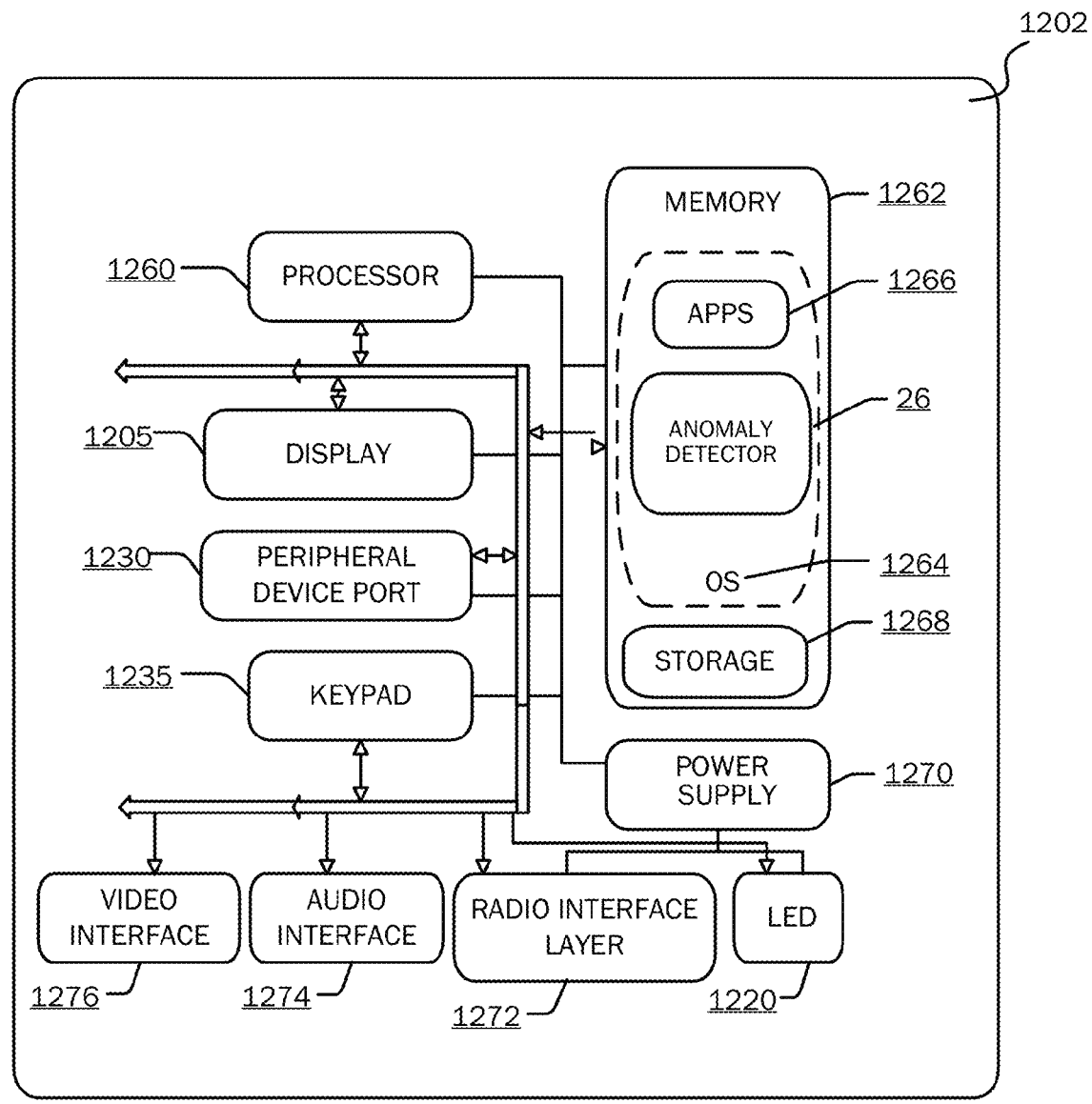
Figure 11:
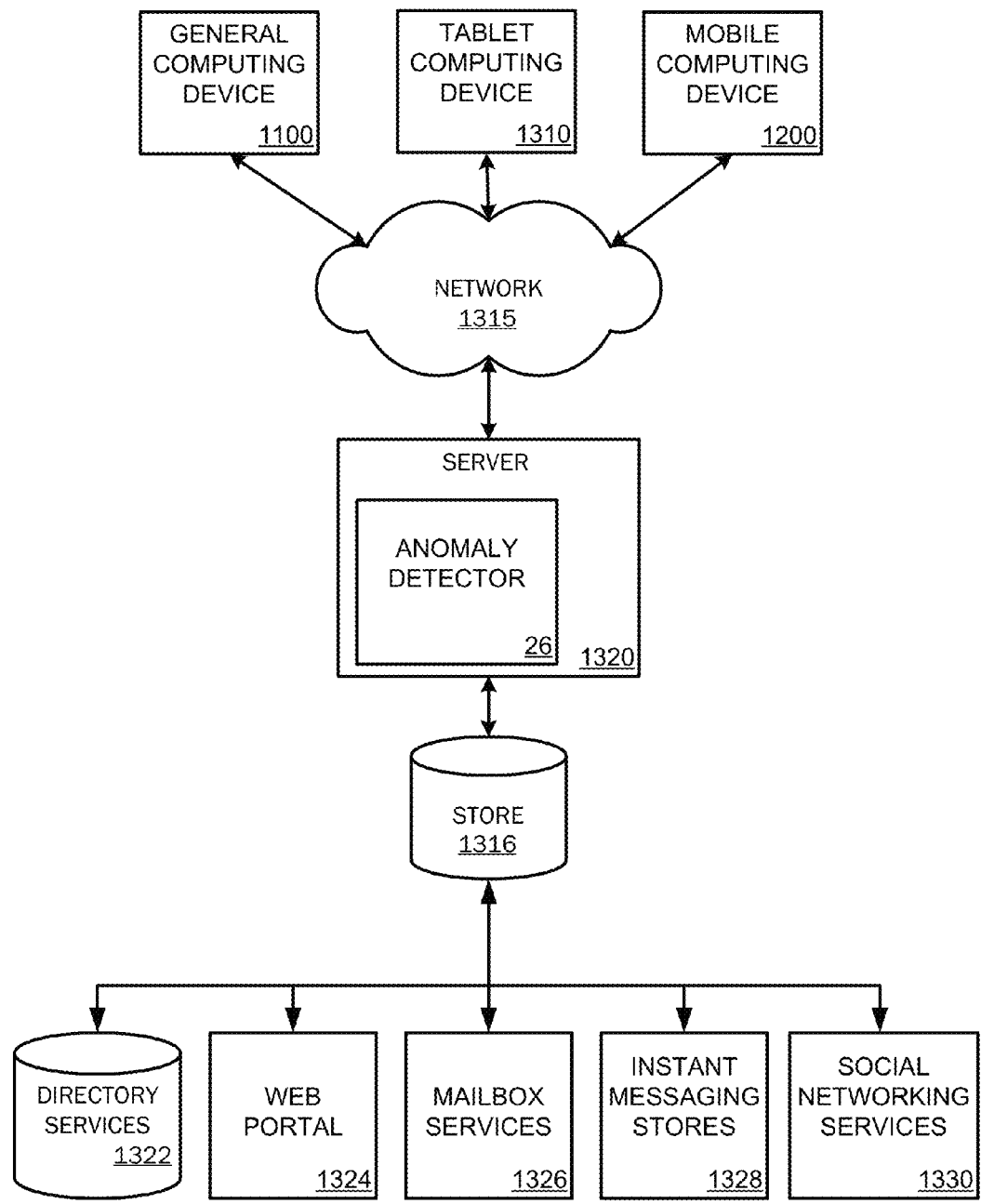

FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the anomaly detector 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 9 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 9 by a removable storage device 1109 and a non-removable storage device 1110.

As stated above, a number of program modules and data files may be stored in the system memory 1104. While executing on the processing unit 1102, the program modules 1106 (e.g., the anomaly detector 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the anomaly detector 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118.

Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a mobile computing device 1200, for example, a mobile telephone, a smart phone, a tablet personal computer, a laptop computer, and the like, with which embodiments of the invention may be practiced. With reference to FIG. 10A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the anomaly detector 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 10B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 11 illustrates an embodiment of an architecture of an exemplary system, as described above. Content developed, interacted with, or edited in association with the anomaly detector 26 may be stored in different communication channels or other storage types. For example, various documents may be stored using a directory service 1322, a web portal 1324, a mailbox service 1326, an instant messaging store 1328, or a social networking site 1330. The anomaly detector 26 may use any of these types of systems or the like for enabling data utilization, as described herein. A server 1320 may provide the anomaly detector 26 to clients. As one example, the server 1320 may be a web server providing the anomaly detector 26 over the web. The server 1320 may provide the anomaly detector 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for detecting anomalous activity in an online service, comprising:
   accessing a baseline profile comprising past event information related to a plurality of past events, wherein each past event in the plurality of past events originates from at least one account of the online service;
   calculating a first past event frequency for a first past event, wherein the first past event frequency is determined in relation to the other past events in the plurality of past events;
   calculating a second past event frequency for a second past event, wherein the second past event frequency is determined in relation to the other past events in the plurality of past events;
   accessing a recent profile comprising recent event information related to recent events that originate from accounts of the online service;
   calculating a first recent event frequency for a first recent event in the recent events, wherein the first recent event frequency is determined in relation to the other recent events;
   calculating a second recent event frequency for a second recent, wherein the second recent event frequency is determined in relation to other recent events determining that the first past event occurs at a higher frequency than the first recent event;
   determining that the second past event occurs at a lower frequency than the second recent event; and
   generating a report, wherein the report includes information related to the first past event occurring at the higher frequency than the first recent event and the second past event occurring at the lower frequency than the second recent event.

2. The method of claim 1, wherein the past event information and the recent event information comprises security events of the online service.

3. The method of claim 1, wherein the recent profile comprises recent event information that occurs from between a few hours and a day of activity related data.

4. The method of claim 1, further comprising periodically accessing event information from accounts of the online service and updating the baseline profile and the recent profile using the accessed information.

5. The method of claim 1, wherein determining that the first past event occurs at the higher frequency than the first recent event includes setting a weight.

6. The method of claim 1, wherein the baseline profile and the recent profile comprises event information that is obtained from operator accounts that have permissions to create, modify, and delete accounts for users.

7. The method of claim 1, further comprising receiving configuration information relating to configuring events to monitor and include in the recent profile and the baseline profile.

8. The method of claim 1, wherein reporting the anomalous activity when detected comprises automatically creating a report that ranks each account being monitored according to a detected level of anomalous activity and displaying more detailed information relating to the anomalous activity of at least one of the accounts when determined.

9. A computer-readable storage device storing computer-executable instructions for detecting anomalous activity in an online service, comprising:
- accessing a baseline profile comprising past event information related to a first category of event and a second category of event, wherein each event in the first category and each event in the second category originates from accounts of the online service;
- calculating the ratio between the occurrence of each event in the first category to the occurrence of each event in the second category of event to form a baseline frequency;
- accessing a recent profile comprising recent event information that originated within a last day from an account of the online service, wherein the recent event information comprises a first plurality of events, wherein each event of the first plurality of events is categorized as the first category of event; wherein the recent event information comprises a second plurality of events, wherein each event in the second plurality of events is categorized as the second category of events;
- calculating the ratio between each event in the first plurality of events to the occurrence of each event in the second plurality of events to form a recent event frequency;
- comparing the baseline frequency with the recent event frequency;
- determining that the baseline frequency is different than the recent event frequency; and reporting an indication that the baseline frequency and the recent event frequency are different.

10. The computer-readable storage device of claim 9, further comprising periodically accessing a system log to obtain event information from the accounts of the online service and updating the baseline profile and the recent profile using the accessed information.

11. The computer-readable storage device of claim 9, further comprising associating a weight with each of the events that are included in the baseline profile, wherein the weights affect how much an occurrence of the event is used in calculating the baseline frequency.

12. The computer-readable storage device of claim 9, wherein the baseline profile comprises past event information from operator accounts.

13. The computer-readable storage device of claim 9, further comprising displaying a Graphical User Interface (GUI) and receiving configuration information relating to configuring the events from the GUI.

14. The computer-readable storage device of claim 9, wherein reporting comprises automatically creating a report and delivering the report and displaying more detailed information relating to at least one of the accounts in response to a selection of an account within the report.

15. A system for detecting anomalous activity in an online service, comprising:
- a processor and memory;
- an operating environment executing using the processor; and
- an anomaly detector that is configured to perform actions comprising:
  - accessing a baseline profile comprising past event information related to a first category of event and a second category of event, wherein each event in the first category and each event in the second category originates from accounts of the online service;
  - comparing the first category of event to the second category of event to form a baseline frequency;
  - accessing a recent profile comprising recent event information, wherein the recent event information comprises a first plurality of events, wherein each event of the first plurality of events is categorized as the first category of event; wherein the recent event information comprises a second plurality of events, wherein each event in the second plurality of events is categorized as the second category of event;
  - comparing the first plurality of events and the second plurality of events to form a recent event frequency;
  - comparing the baseline frequency with the recent event frequency; and
  - reporting activity that is an anomaly based on the comparison between the baseline frequency and the recent event frequency.

16. The system of claim 15, further comprising periodically accessing a system log to obtain event information from accounts of the online service and updating the baseline profile and the recent profile using the accessed information.

17. The system of claim 15, further comprising associating a weight with each of the events that are included in the baseline profile.

18. The system of claim 15, further comprising displaying a Graphical User Interface (GUI) and receiving configuration information relating to configuring the events from the GUI.

19. The computer-readable storage medium of claim 9, wherein the first category of event is a permission change and the second category of events is logging onto the online service.

20. The system of claim 15, wherein the first category of event is a permission change and the second category of events is logging onto the online service.

* * * * *